Aug. 31, 1954  H. C. GREER, SR., ET AL  2,687,606
MOWER ATTACHMENT FOR TRACTORS
Filed Sept. 5, 1951  3 Sheets-Sheet 3
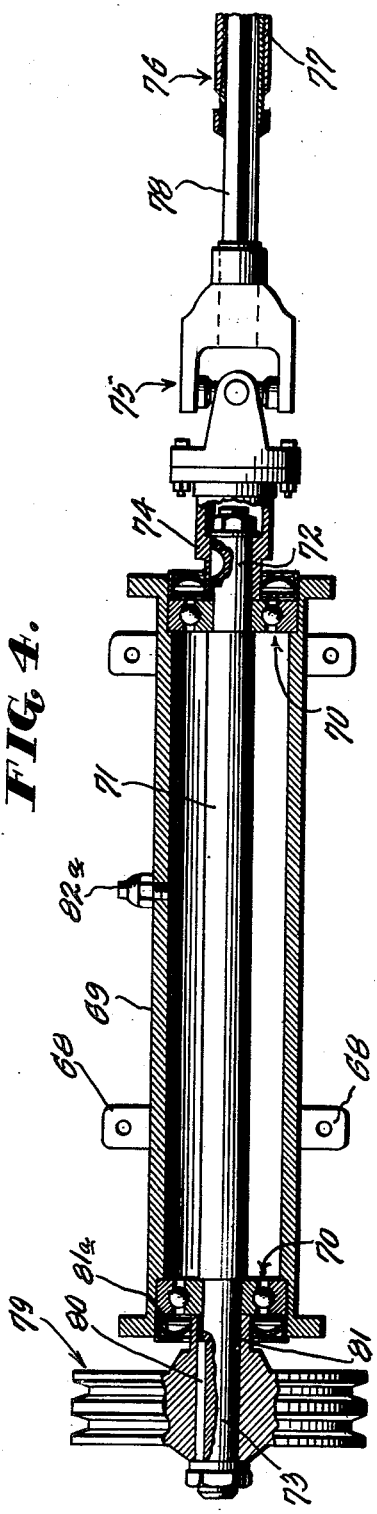
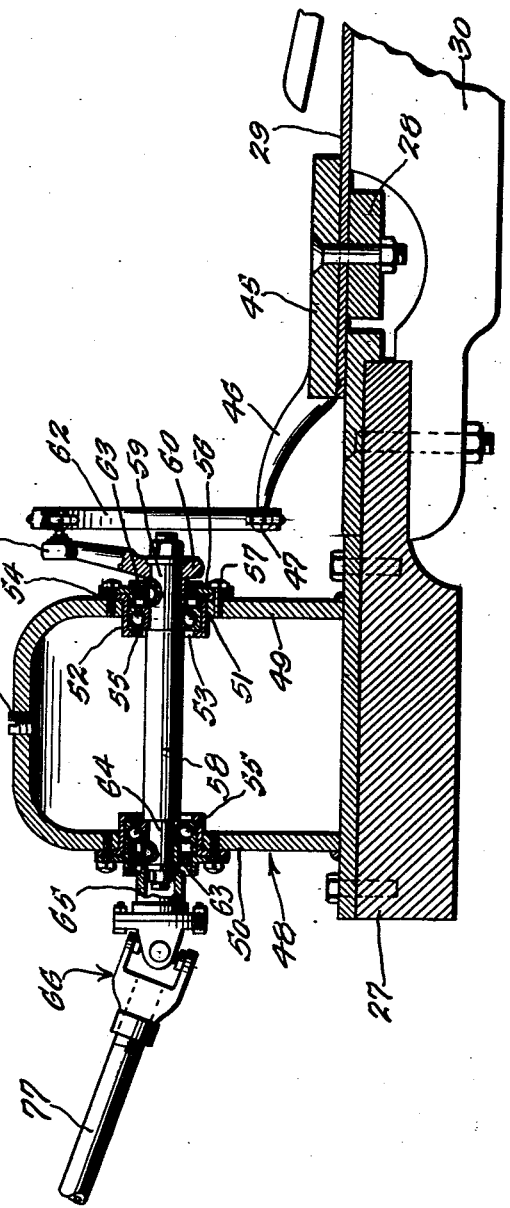
Inventors
*Homer C. Greer, Sr.*
*William G. Webb*
By *Wilfred Lawson*
Attorney Patented Aug. 31, 1954

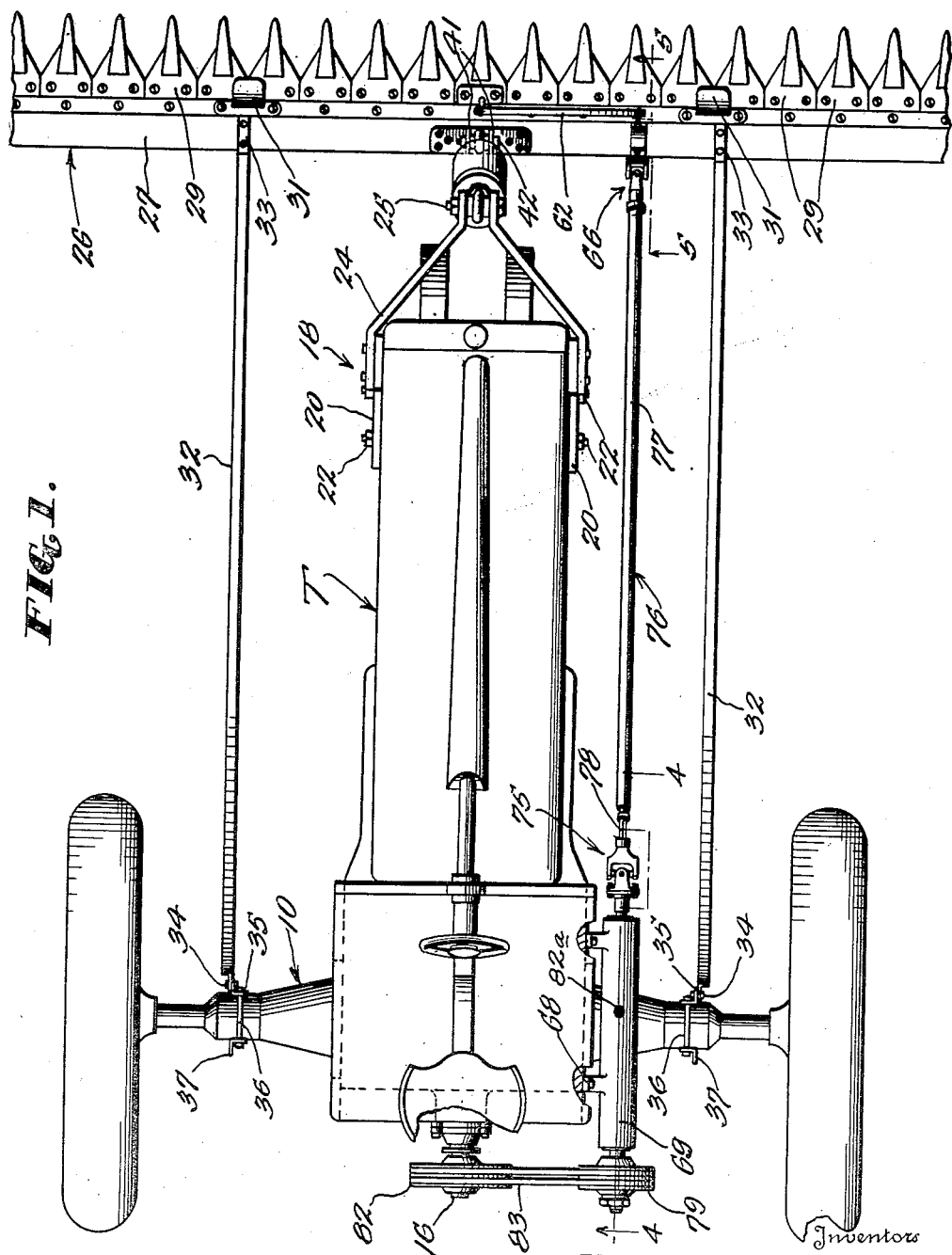

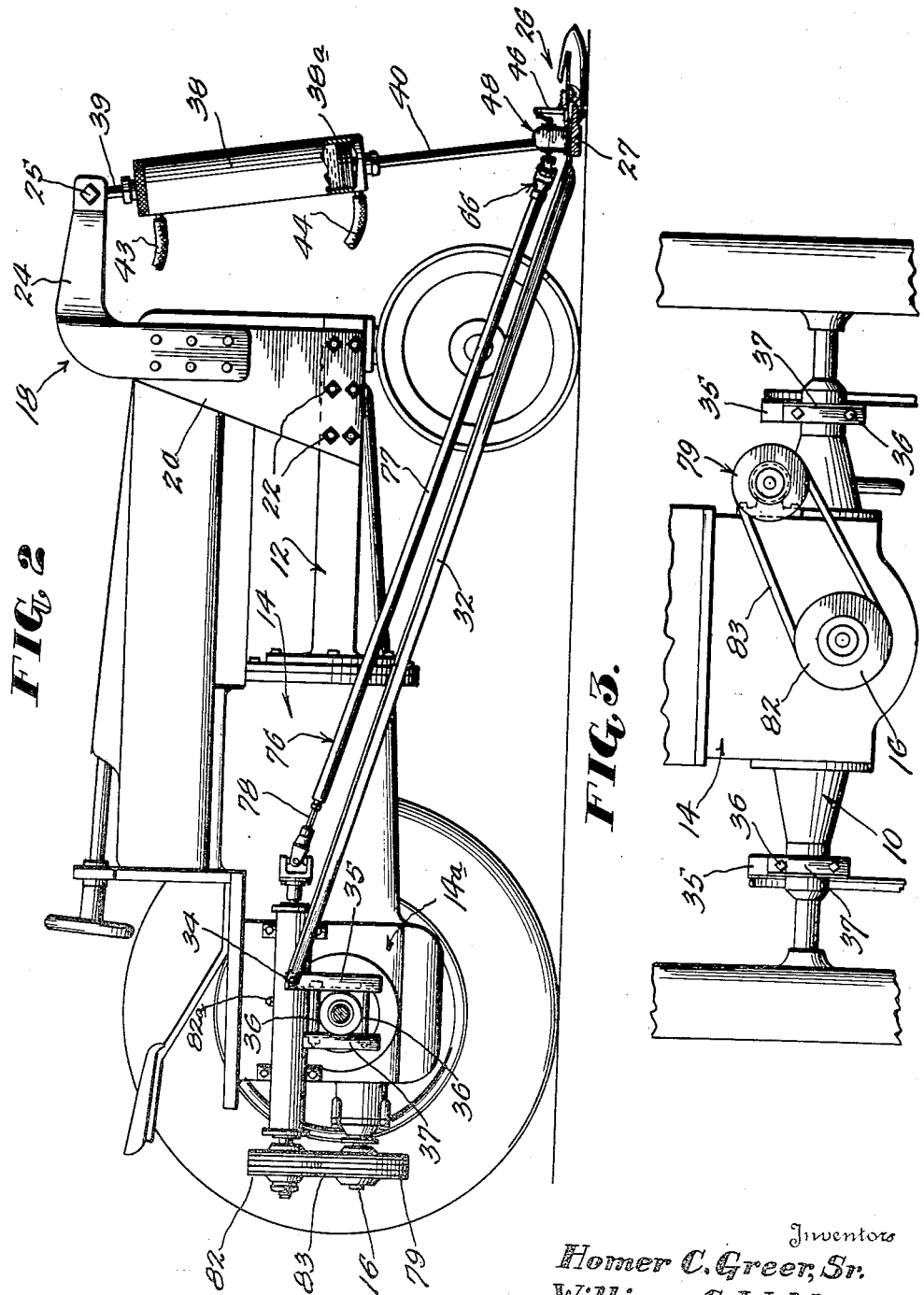

2,687,606

UNITED STATES PATENT OFFICE 2,687,606

MOWER ATTACHMENT FOR TRACTORS

Homer C. Greer, Sr., and William G. Webb, Anguilla, Miss.

Application September 5, 1951, Serial No. 245,128

1 Claim. (Cl. 56—25)

This invention relates generally to the class of mowing machines and is directed particularly to an improved mower structure designed to be mounted upon a power vehicle.

A principle object of the present invention is to provide a novel mower device which is designed to be mounted upon a tractor, to be operated therefrom, such mower structure being supported in such a manner as to make possible its elevation to and operation at a position where it can be safely passed over crop plants such as cotton, beans, corn, oats and the like.

Another object of the invention is to provide a mower attachment for tractors which can be readily mounted on and removed from a tractor whereby it may be conveniently shifted from one tractor to another, the mower being provided with a hydraulic means which may be connected with the usual fluid power source to be found on the majority of tractors, to facilitate the raising and lowering of the cutter mechanism of the mower when desired.

Another object of the invention is to provide a mower attachment for tractors, wherein the cutter bar is directly connected with supporting arms which are pivotally mounted upon the rear axle housing for the tractor so that the cutter bar can be raised and lowered by means of hydraulic power means connected between a support at the front of the tractor and the cutter bar, the mower blade operating means being connected with the power take-off of the tractor to be actuated thereby.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in top plan of a tractor showing the mower structure of the present invention applied thereto.

Figure 2 is a view in side elevation of the same, the mower structure being shown in its lowered position.

Figure 3 is a fragmentary view in rear elevation of a portion of the tractor structure showing the driving connection between the mower drive shaft and the tractor power take-off.

Figure 4 is a longitudinal sectional view on an enlarged scale taken substantially on the line 4—4 of Figure 1.

Figure 5 is a sectional view, on an enlarged scale, taken substantially on the line 5—5 of Figure 1.

Referring now more particularly to the drawings there is illustrated a conventional type of tractor which is generally designated T, such as the present mower attachment is designed to be mounted upon. In this tractor the numeral 10 generally designates the rear axle housing while the numeral 12 designates the chassis frame upon which is mounted the usual engine structure 14.

At 16 there is designated the usual or conventional power take-off.

In accordance with the present invention there is provided a carrier mount which is located at the front of the machine and is generally designated 18. This carrier mount, as shown, comprises two upstanding side plates 20 which are suitably bolted as at 22 to the sides of the frame 12. These plates stand upright at the opposite sides of the machine and each has bolted or otherwise secured thereto the upwardly and forwardly curving arms 24 which have their forwardly directed ends in convergent relation at a location in advance of the front of the tractor structure and such convergent ends carry a transverse coupling or hinge pin 25.

The numeral 26 generally designates a mower of the type comprising a long cutter or finger bar 27 on which is reciprocably mounted a blade bar 28 carrying a plurality of forwardly projecting cutter blades 29. The numeral 30 designates the usual forwardly projecting guard shoes across which the cutter blades 29 move in reciprocation of the bar 28. In the conventional motor the bar 28 is maintained in position by guide plates 31 which are secured to the cutter bar 27, the guard shoes 30 also being secured to this bar 27 in the usual well known manner.

The mower 26 is of substantial length to extend the full width or more across the front of the tractor structure and it is supported for vertical swinging movement by a pair of frame arms 32 which are disposed at opposite sides of the tractor and each of which is secured as indicated at 33, to the cutter bar 27.

The frame arms 32 extend rearwardly and have their rear ends across the top of the axle housing and are pivotally connected as at 34 to a vertical mounting bar 35 which is clamped against the front of the axle housing by the upper and lower coupling bolts 36 which extend rearwardly to and pass through a rear clamp bar 37. The pivots 34 are horizontal so that the mower may be raised or elevated by the means about to be described.

The elevating or raising and lowering mechanism for the mower comprises a fluid power cylinder 38 having extending from one end the supporting arm 39 which is located between the forward ends of the arms 24 and is traversed by and pivotally supported on the pivot pin 25.

The fluid power cylinder 38 houses a suitable piston 38a, to which is connected the rod 40 which extends downwardly through the lower end of the cylinder and is coupled to the mower cutter bar 27 by means of the pair of spaced upstanding ears 41 and the pivot bolt 42 which extends across between and connects the ears, the lower end of the rod being suitably formed to position between the ears 41 and to have the pivot bolt 42 pass therethrough. Suitable means is provided at the upper and lower ends of the piston or power cylinder 38 for the connection of power fluid lines 43 and 44, such fluid lines being supplied with power fluid from a suitable source, not shown, to effect the raising and lowering of the rod 40 and the cutter or mower unit connected therewith. As will be readily understood, tractors, in addition to being provided with a mechanical power take-off means such as that indicated at 16, are in the majority of cases provided with a source of fluid or hydraulic power and such source of power is connected through the medium of a suitable control valve, not shown, with the lines 43 and 44 whereby the fluid can be directed in through one line and out through the other and vice versa for effecting the raising of the mower and the lowering thereof.

For effecting the reciprocal motion of the blade bar 28 the following mechanism is provided for transmitting power from the power take-off 16 to the blade bar.

The blade bar has secured thereto at approximately midway between its ends as shown in Figure 1, a plate 45 which carries a rearwardly projecting arm 46 terminating in a pivot knuckle or head 47.

At one side of the transverse center of the cutter bar there is mounted upon the top of and fixed to the bar an upright grease box 48 having forward and rear walls 49 and 50 respectively.

In each of the walls of the grease box is an opening 51 in which is fitted a bearing cup 52 having the inner end open as at 53 and having an outwardly extending surrounding flange 54 on its outer end which positions against the outer face of the adjacent box wall as is clearly shown in Figure 5.

Fitted in the bottom of each cup 52 is an antifriction bearing 55 and this is retained in place by the flanged sleeve 56 which enters the outer end of the cup and the flange of the sleeve and the flange 54 of the cup, are secured to the wall of the grease box by the bolt 57.

The bearings 55 are aligned and extending through the grease box is the short shaft 58 which has the reduced forward end 59 which projects beyond the front wall 49 of the grease box and has keyed thereon the hub 60 of a crank arm 61.

The crank arm 61 and the knuckle 47 are operatively coupled together by a pitman 62.

Surrounding the hub portion 60 of the crank arm 61 and fitted in the flanged collar 56 adjacent thereto, is a grease retainer 63.

The rear end of the shaft 58 is also reduced as shown at 64 and projects rearwardly through the adjacent bearing 55 and has fitted thereon the collar 65 which is coupled with one of the two elements of a conventional universal joint which is generally designated 66. The collar 65 is keyed to the end 64 of the shaft 58 and is encircled by a grease retainer of the same character as that fitted into the forward flanged sleeve 56, which latter retainer is also designated 63.

The box 48 is designed to be filled with grease or lubricant of proper consistency and for this purpose the top of the box is provided with a removable plug 67. Thus the shaft 58 and the bearings at the two ends thereof are constantly bathed in the lubricant.

On the side of the transmission housing of the tractor, generally designated 14a, there is secured in horizontal position, by means of mounting ears 68, a tubular grease housing 69, in each end of which is fitted a bearing unit 70. The grease housing 69 is horizontally disposed above a rear axle housing 10 and there extends through this housing 69 the power transmitting shaft 71, the forward and rear ends of which are reduced as indicated at 72 and 73 respectively and each extends through the adjacent bearing 70.

The forward extension 72 of the shaft 71 has fitted thereon and keyed thereto, the collar 74 which is secured to one of the two elements of a conventional universal coupling which is generally designated 75.

Located between and operatively connecting the universal couplings 66 and 75 is a longitudinally extensible shaft which is generally designated 76 and which comprises a tubular portion 77, the lower end of which is connected to the lower coupling 66, and an upper section of polygonal cross section 78, which is connected to the upper universal coupling 75 as shown in Figure 4. It will be understood that the internal cross sectional form of the tubular portion 77 is the same as the cross sectional form of the section 78 so that the two sections can have a relative longitudinal movement but are secured together against relative rotational movement.

The rear end portion 73 of the shaft 71 is of materially greater length than the forward reduced portion 72 as shown in Figure 4 and this rear end portion 73 has mounted thereon a belt pulley 79. This pulley is here shown as being formed to receive a V-belt and it is also shown with two grooves but it is to be understood that the invention is not to be limited to this particular form or style of pulley wheel.

The pulley wheel shown has a key 80 securing it to the reduced end 73 of the shaft and at one end of the hub portion of the pulley is a sleeve 81 which extends forwardly to the adjacent bearing 70. Encircling this sleeve 81 and also the sleeve portion 74 of the universal coupling 75, is a grease retainer 81a of conventional form.

The tubular housing 69 is provided with a grease fitting 82a so that the housing may be filled with a suitable lubricant which will lubricate the bearings 70 and the grease retainer 81a will prevent the grease from escaping from the ends of the housing.

The power take-off 16 of the tractor is also provided with a pulley wheel which is designated 82 and is also here shown as being in the form of a double groove pulley to receive the V-belts 83 which connect the power take-off pulley with the pulley 79. It is understood, however, as previously stated that the invention is not limited to the use of this particularly style of coupling between the power take-off and the shaft 71 as it will be readily obvious that other types of drive connection may be employed without departing from the spirit of the invention.

It will be readily apparent from the foregoing that when it becomes necessary to elevate the mower above plants which are not to be destroyed, the fluid power is introduced into the lower end of the power cylinder 38 so as to effect the upward movement of the piston 38a and rod 40 and the raising of the mower 26. This upward pull applied to the mower 26 by the piston rod 40 will cause the mower to swing with the frame arms 32 about the pivot centers 34 whereby the mower can be elevated as desired or lowered when necessary by reversing the power fluid flow.

From the foregoing it will be readily apparent that there is provided by the present invention a simple but efficient mowing apparatus which can be readily attatched to or removed from any of the various makes of tractors which are supplied with necessary mechanical power take-off and fluid power source, it being understood, of course, that the mounting bolts 22 for the side plates on which the power cylinder supporting arms 24 are mounted, will be engaged in suitable openings in the frame 12 whereby the bolts can be easily and quickly taken out or replaced.

We claim:

In a mower attachment for tractors, including the power takeoff of the tractor, said tractor having a rear axle housing, a reciprocating blade type of mower disposed transversely of and beyond the forward end of the tractor and operatively connected with said power takeoff, said mower having a finger bar, a pair of lift arms extending forwardly at opposite sides of the tractor body, pivot mountings on the housing of the rear axle of the tractor for the adjacent ends of said lift arms, connections between the forward ends of said lift arms and the finger bar of the mower, brackets of inverted L-angle form mounted on the opposite sides of the tractor body adjacent the forward end thereof, the vertical arms of said brackets projecting above the top of said body and the horizontal arms thereof projecting forwardly beyond the front end of the body and converging toward each other, a hinge pin mounted in the free ends of said arms, a fluid pressure cylinder dependingly supported from said pivot pin and including a piston carried rod depending through its lower end, a pivot connection between the lower end of said rod and the center of the finger supporting bar of the mower, and means for supplying fluid under pressure to said cylinder for actuating said piston and rod to effect the lowering and raising the mower relative to the ground.

References Cited in the file of this patent

UNITED STATES PATENTS

| Number | Name | Date |
|---|---|---|
| 2,485,383 | Hoyt | Oct. 18, 1949 |
| 2,565,252 | McFaull | Aug. 21, 1951 |
| 2,575,369 | Thornton-Trump | Nov. 20, 1951 |
| 2,592,824 | Richey | Apr. 15, 1952 |